US012181680B1

(12) United States Patent
Melakari

(10) Patent No.: US 12,181,680 B1
(45) Date of Patent: Dec. 31, 2024

(54) ADAPTIVE SHADING ADJUSTMENT IN OPTICAL APPARATUSES

(71) Applicant: Pixieray Oy, Espoo (FI)

(72) Inventor: Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 18/468,945

(22) Filed: Sep. 18, 2023

(51) Int. Cl.
*G02B 27/01* (2006.01)
*G06F 3/01* (2006.01)
*G09G 3/20* (2006.01)

(52) U.S. Cl.
CPC .......... *G02B 27/0172* (2013.01); *G06F 3/013* (2013.01); *G09G 3/20* (2013.01); *G02B 2027/0118* (2013.01); *G02B 2027/0178* (2013.01); *G09G 2320/0626* (2013.01); *G09G 2370/00* (2013.01)

(58) Field of Classification Search
CPC ........ G02B 27/0172; G02B 2027/0118; G02B 2027/0178; G06F 3/013; G09G 3/20; G09G 2320/0626; G09G 2370/00
See application file for complete search history.

(56) References Cited

U.S. PATENT DOCUMENTS

| | | | | |
|---|---|---|---|---|
| 2017/0124943 A1* | 5/2017 | Peana | ................... | G09G 3/3225 |
| 2021/0239976 A1* | 8/2021 | Pridie | .................... | G02B 30/52 |
| 2021/0333552 A1* | 10/2021 | Chiu | ................... | G02B 27/4205 |
| 2022/0066217 A1* | 3/2022 | Takeda | ............... | G02B 27/0172 |
| 2022/0398986 A1* | 12/2022 | DeWall | .................... | G06F 3/147 |

* cited by examiner

*Primary Examiner* — Sahlu Okebato
(74) *Attorney, Agent, or Firm* — Ziegler IP Law Group LLC

(57) ABSTRACT

Disclosed is an optical apparatus with an optical element per eye; a light-control element arranged on an optical path of light passing through the optical element; light sensor(s); and processor(s) configured to: process tracking data to determine at least one of: a gaze position, a gaze direction, a gaze velocity, a gaze acceleration, per eye of a user; determine a current visual activity of the user; determine an ambient light intensity in an environment; determine a shading intensity to be used for the optical element, based on the ambient light intensity and the current visual activity of the user; and control the light-control element to apply the shading intensity to the optical element.

16 Claims, 3 Drawing Sheets

ADAPTIVE SHADING ADJUSTMENT IN OPTICAL APPARATUSES

TECHNICAL FIELD

The present disclosure relates to optical apparatuses incorporating adaptive shading adjustment. Moreover, the present disclosure relates to methods incorporating adaptive shading adjustment in optical apparatuses.

BACKGROUND

Improper shading in eyeglasses directly affects an overall viewing experience of a user within a real-world environment. When the shading is not accurately adjusted, eyes of the user need to work harder to interpret visual information, leading to a potential cascade of ocular issues, for example, such as eye straining, dryness in the eyes, itchiness in the eyes, headaches, and even blurred vision. Moreover, when the eyeglasses need to be worn by the user for a considerably long duration, the aforesaid symptoms can worsen, compromising the user's visual clarity and an overall ocular health. In dynamic environments where lighting conditions change frequently, a lack of appropriate shading adjustment in the eyeglasses can make it challenging for users to maintain consistent strain-free visual acuity. Traditional solutions for adjusting shading in the eyeglasses involve manual adjustments by the user (i.e., taking off or putting on eyeglasses) or rely on predetermined shading settings that often fail to be adequately applied, according to the user's visual activity and/or changes in ambient light conditions. Furthermore, as digital devices are becoming increasingly popular in daily routines, it is important to ensure a visual experience of user using such devices remains strain-free and visually-pleasing when the user engages with a display of such devices. This is because such devices emit varying levels of light, often requiring the user's eyes to continually adjust according to the varying levels of the light. Conventional eyeglasses with fixed shading levels provide a same consistent shade irrespective of lighting conditions in an environment where the user is present. This might be suitable for a constant light condition, but in dynamic lighting conditions when the user may be involved in a visual activity, such conventional eyeglasses either provide too much or too little shading, thereby adversely affecting a viewing experience of the user.

Therefore, in light of the foregoing discussion, there exists a need to overcome the aforementioned drawbacks.

SUMMARY

The aim of the present disclosure is to provide an optical apparatus and a method for accurately and reliably determining a shading intensity to be used for an optical element of the optical apparatus according to a current visual activity of a user, thereby providing an intensity-optimized strain-free viewing experience to said user. The aim of the present disclosure is achieved by an optical apparatus and a method incorporating adaptive shading, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
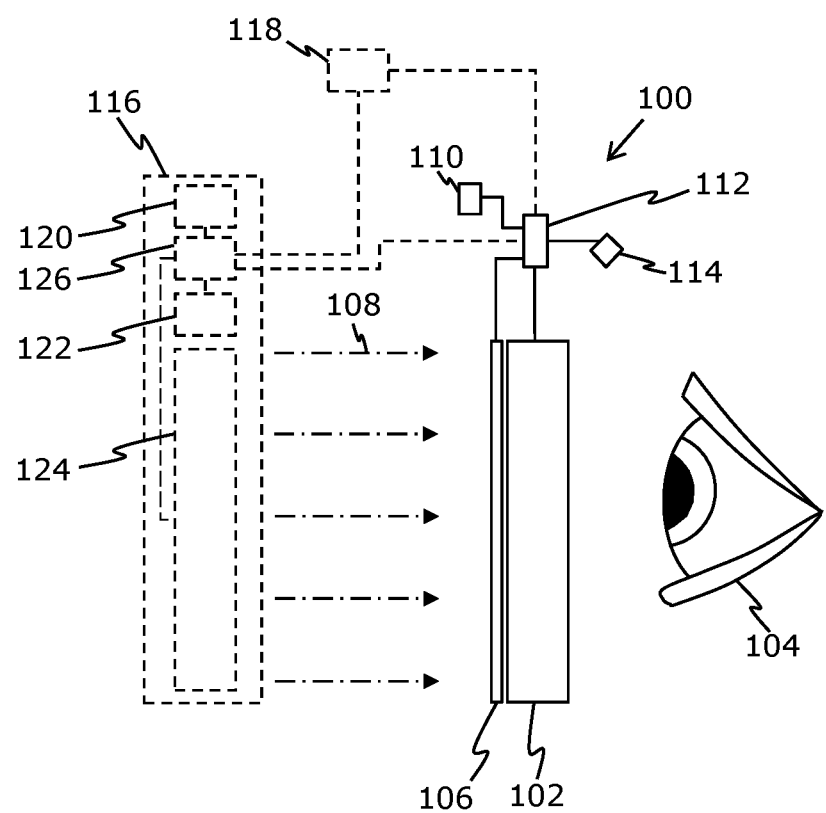
FIG. 1 illustrates an optical apparatus incorporating adaptive shading adjustment in use, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides an optical apparatus comprising:
   an optical element per eye;
   a light-control element arranged on an optical path of light passing through the optical element;
   at least one light sensor; and
   at least one processor configured to:
      process tracking data, collected by at least one of: an eye-tracking means of the optical apparatus, an eye-tracking means of an external device, a face-tracking means of the external device, to determine at least one of: a gaze position, a gaze direction, a gaze velocity, a gaze acceleration, per eye of a user;
      determine a current visual activity of the user based on the at least one of: the gaze position, the gaze direction, the gaze velocity, the gaze acceleration, a relative orientation of the user's face with respect to a display of the external device, a distance of the user's face from the display;
      process sensor data, collected by the at least one light sensor, to determine an ambient light intensity in an environment where the optical apparatus is being used;
      determine a shading intensity to be used for the optical element, based on the ambient light intensity and the current visual activity of the user; and
      control the light-control element to apply the shading intensity to the optical element.

In a second aspect, the present disclosure provides a method implemented by an optical apparatus comprising an optical element per eye, a light-control element arranged on an optical path of light passing through the optical element, at least one light sensor, and at least one processor, wherein the method comprises:
   processing tracking data, collected by at least one of: an eye-tracking means of the optical apparatus, an eye-tracking means of an external device, a face-tracking means of the external device, for determining at least one of: a gaze position, a gaze direction, a gaze velocity, a gaze acceleration, per eye of a user;

determining a current visual activity of the user based on the at least one of: the gaze position, the gaze direction, the gaze velocity, the gaze acceleration, a relative orientation of the user's face with respect to a display of the external device, a distance of the user's face from the display;

processing sensor data, collected by the at least one light sensor, for determining an ambient light intensity in an environment where the optical apparatus is being used;

determining a shading intensity to be used for the optical element, based on the ambient light intensity and the current visual activity of the user; and controlling the light-control element for applying the shading intensity to the optical element.

The present disclosure provides an optical apparatus and a method for accurately and reliably determining a shading intensity to be used for the optical element, thereby providing an intensity-optimized strain-free viewing experience to said user. Herein, the at least one processor takes into account information pertaining to a visual task that the user is engaged in (namely, the currently visual activity), and the ambient light intensity in the environment, for determining the shading intensity in an adaptive manner. The shading intensity determined/adjusted in this manner is highly accurate and favourable for the user engaged in a particular visual activity under certain lightning condition, i.e., the shading intensity would not be too much or too little. This improves an overall visual experience of the user, for example, in terms of optimal visual comfort, reducing eye strain and enhancing a user experience while using external devices in different lighting conditions. The optical apparatus and the method are susceptible to be used in environments with dynamic lighting conditions. Moreover, the optical apparatus is suitable to be employed for accurately, reliably adjusting adaptive shading for different users having different eye configurations. The optical apparatus and the method are simple, robust, support real-time/near-real time adaptive shading in optical apparatuses, and can be implemented with ease.

Throughout the present disclosure, the term "optical apparatus" refers to an apparatus that is to be worn over the eyes of the user. Examples of such an optical apparatus include, but are not limited to, a pair of glasses, a pair of sunglasses, smart glasses, and a head-mounted display.

Throughout the present disclosure, the term "optical element" refers to an element of the optical apparatus through which light passes to reach the user's eyes. Optionally, the optical element is implemented as any one of: an active optical element, a passive optical element. Herein, the term "active optical element" refers to an optical element whose optical power is (actively) adjustable. In this regard, the optical element is (optionally, electrically) controlled to produce one or more optical powers for each eye. Moreover, the term "passive optical element" refers to an optical element whose optical power is fixed (i.e., non-adjustable or static).

Throughout the present disclosure, the term "light-control element" refers to a component that is used to control at least one optical property of the light passing through the light control element, when the optical apparatus is in use. Herein, the at least one optical property may include, but is not limited to, an intensity, an optical transmission, a polarization, a direction, and a colour, of the light. The term "light" used herein refers to visible light. Moreover, the light could be at least a polarized light. The light-control element is arranged on an optical path of the light passing through the optical element towards the eye. In one example, the light-control element could be in contact with the optical element. In another example, the light-control element could be implemented as a layer of the optical element. In yet another example, the light-control element could be arranged as at least one separate element in front of and/or behind the optical element.

Optionally, the light-control element is implemented as at least one of: an electrochromic element, a liquid crystal element, at least two polarizers. A technical benefit of this is that depending on the specific design and intended application of the optical apparatus, the light-control element can be implemented from amongst various elements, each with their own unique construction and operation.

The term "electrochromic element" refers to a component that changes colour and/or the at least one optical property of the light when an electric signal (i.e., current signal) is applied to said component. The electrochromic element can be implemented by applying one or more conductive coatings on the optical element. In such a case, when the electrochromic element is activated by applying electricity, metal ions within the conductive coating get ionised; as a result, the metal ions get attracted towards one surface of the coating, building up at said surface. This provides a shading effect, for example, within a double or triple glazed unit. When the optical element is implemented as the active optical element, the colour of the optical element can be electrochemically switched between different colours, wherein the colour ranges from no colour to any colour in a visible spectrum. Furthermore, electrochromic element could be implanted in the optical element in various colours. Herein, the term "implanting" refers to inserting or embedding the electrochromic element into the optical element. A technical effect of implementing the light-control element as the electrochromic element is that the amount of light entering the user's eyes through the optical element can be dynamically controlled by changing an opacity or a tint of the electrochromic element, based on the shading intensity to be used for the optical element.

The term "liquid crystal element" refers to a component which changes the at least one optical property of the light based on changes in alignment of liquid crystal molecules within said component. By applying an electric field, the alignment (i.e., an orientation) of these liquid crystal molecules can be changed, which in turn alters light transmission through the optical element. The liquid crystal element comprises a liquid crystal active material disposed between two optically transparent electrodes, wherein each electrode is arranged on an optically transparent substrate. A technical effect of implementing the light-control element as the liquid crystal element is that the liquid crystal element facilitates the dynamic alteration of light transmission in the optical element by changing the orientation of the liquid crystal molecules, based on the shading intensity to be used for the optical element.

The term "polarizer" refers to an optical filter that allows light of a particular polarization orientation to pass through while blocking light of other polarization orientations. In an example, the at least two polarizers may be implemented as a first polarizer and a second polarizer. Herein, the first polarizer and the second polarizer polarize the light of at least one type at a plurality of polarization orientations. Optionally, the first polarizer is any one of: a horizontal polarizer, a vertical polarizer, and wherein the second polarizer is another one of: the vertical polarizer, the horizontal polarizer. The horizontal polarizer allows light of a horizontal polarization orientation to pass therethrough, whereas the vertical polarizer allows light of a vertical polarization orientation to pass therethrough. Optionally, the first polarizer and the second polarizer are arranged on different sides of the optical element. Alternatively, the first polarizer and the second polarizer are arranged on a same side of the optical element. It will be appreciated that the first polarizer and the second polarizer work in conjunction with each other. A technical effect of implementing the at least two polarizers (namely, the first polarizer and/or the second polarizer) is that the given polarizer selectively transmits light of the particular polarization orientation, based on the ambient light intensity and the current visual activity of the user (as described below). This beneficially improves the user's experience.

In an instance, the presence of two polarizers offers dynamic control over the amount of light reaching the user's eyes. When both polarizers are active, they work collaboratively to reduce the overall light penetration, ensuring minimal light passes towards the user's eyes (i.e., high shading intensity). This mode is especially beneficial during intensely bright conditions, giving the user a comfortable viewing experience without excessive glare or brightness. In situations with ample (but not intensive) natural or artificial light, such as regular indoor conditions, activating only one of the polarizers can be sufficient. Optionally, the horizontal polarizer is selected in these scenarios, as it effectively cuts down the horizontal light oscillations, reducing glare and intensity of the light entering the user's eyes. Alternatively, optionally, when the user is engaged with the display of the external device, the vertical polarizer is activated, as most displays emit light predominantly polarized in the vertical direction. By aligning with this orientation, the optical apparatus ensures that the visual information from the display is presented clearly and with the right intensity, minimizing eye strain and optimizing the viewing experience.

Throughout the present disclosure, the term "light sensor" refers to a component capable of detecting and measuring the intensity of light incident thereupon. The at least one light sensor may utilize photosensitive materials to produce an electrical signal proportional to the intensity of light they receive. In the optical apparatus, the at least one light sensor captures sensor data indicative of the ambient light intensity in the environment surrounding the optical apparatus. The at least one light sensor is positioned in the optical apparatus so as to accurately capture the ambient light conditions along at least one direction. The at least one light sensor may be arranged either on a surface of the optical apparatus or may be embedded within its frame, in a manner that ensuring nil or minimal obstruction to the user's vision. The placement of the at least one light sensor may also be chosen to minimize interference or shadowing from other components of the optical apparatus. In an example, the at least one light sensor may be positioned in a bridge portion of the frame of the optical apparatus. The at least one light sensor is communicably coupled to the at least one processor, and configured to transmit the sensor data to the at least one processor. The sensor data is then used by the at least one processor to determine the necessary adjustments to be made by the light-control element, for applying the shading intensity to the optical element. By continuously or periodically measuring the ambient light intensity, the at least one light sensor ensures that the shading intensity of the optical element is always in synchronization with the ambient conditions, offering an intensity-optimized strain-free viewing experience to the user.

Optionally, the at least one light sensor is implemented as a visible light sensor. In an example implementation, a given light sensor may be implemented as a photodiode. The photodiode may, for example, be made up of silicon, germanium, indium gallium arsenide, mercury cadmium telluride, and the like. Photodiodes are well-known in the art.

The term "ambient light" refers to light present in the environment. The ambient light could, for example, be natural light (for example, such as sunlight) or an artificial light (for example, light emitted from a lamp, a tube-light, a light-emitting element of a display). Moreover, the term "ambient light intensity" refers to an amount of the ambient light present in the (real-world) environment whereat the optical apparatus is present. The sensor data may comprise light intensity values (for example, measured in terms of lux or candela per square meter), colour temperature values, luminance values, brightness values, and the like. In some implementations, the at least one light sensor may be implemented as an ambient light sensor. Such light sensors are well-known in the art.

Throughout the present disclosure, the term "eye-tracking means" refers to specialized equipment for detecting and/or following the gaze of the user, when the optical apparatus, in operation, is worn by the user. Optionally, the eye-tracking means of the optical apparatus is implemented by way of at least one of: contact lenses having sensors, cameras monitoring features of the eyes, sensors arranged on a frame of the optical apparatus. Similarly, optionally, the eye-tracking means of the external device is implemented by way of at least one of: contact lenses having sensors, cameras monitoring features of the eyes, sensors arranged on the external device. The features of the eyes may comprise at least one of: a shape of a pupil of each eye, a size of the pupil, corneal reflections of light emanating from a real-world environment from a surface of each eye, a relative position of the pupil with respect to the corneal reflections, a relative position of the pupil with respect to corners of each eye. Such eye-tracking means are well-known in the art. The eye-tracking means is configured to collect the tracking data and send the tracking data to the at least one processor. In an instance, when the eye-tracking means of the optical apparatus and/or the eye-tracking means of the external device is implemented as the camera, the tracking data is in form of images of the user's eye. In another instance, when the eye-tracking means of the optical apparatus and/or the eye-tracking means of the external device is implemented by way of contact lenses having sensors, the tracking data is the sensor data collected from the sensors. The eye-tracking means of the external device may be used when the external device is in proximity of the user, such as when the user is interacting with the external device or viewing visual content on the display of the external device. The external device could, for example, be implemented as a laptop, a desktop, a tablet, a smartphone, a smartwatch, a television, and the like. The display of the external device could, for example, be implemented as a liquid-crystal display (LCD), an organic light-emitting diodes (OLED) display, and a light-emitting diodes (LED) display, or similar.

Throughout the present disclosure, the term "face-tracking means of the external device" refers to a specialized equipment within the external device, that is specifically designed to detect the position and/or orientation of a user's face. Such face-tracking is performed when the user is in proximity of, or is interacting, with the external device. The position of the user's face could be tracked as an absolute position or as a relative position with respect to the external device. For example, the face tracking means may track a distance of the user's face from the external device. Optionally, the face-tracking means of the external device is implemented by way of at least one of: cameras designed for visual or infrared imaging, depth sensors, structured light projectors. Other optical and/or electronic elements suitable for capturing facial details and enabling face-tracking are also well within the scope of the present disclosure. In an instance, when the face-tracking means of the external device is implemented using the cameras, the tracking data may comprise images that capture the user's face. In another instance where depth sensors or structured light projectors are used, the tracking data might include three-dimensional mappings of the user's face, capturing depth and contours of the user's face with precision. In an example, the face-tracking means of the external device may include face detection function of a mobile phone, as embedded in a front facing camera thereof. The face-tracking means of the external device is configured to collect the tracking data and may send this tracking data to a processor of the external device, and the processor of the external device further transmits the tracking data to the at least one processor of the optical apparatus.

It will be appreciated that the tracking data is collected repeatedly by the at least one of: the eye-tracking means of the optical apparatus, the eye-tracking means of the external device, the face-tracking means of the external device, throughout an operation of the optical apparatus, as the gaze of the user's eyes keeps changing whilst the user uses the optical apparatus. An up-to-date tracking data allows for adaptively controlling the light-control element of the optical apparatus to apply the shading intensity to the optical element in an accurate manner, for effectively controlling an intensity of light passing through the optical element towards the user's eyes.

Notably, the at least one processor is communicably coupled to at least the light-control element, the at least one light sensor and the eye-tracking means of the optical apparatus. Further, the at least one processor is communicably coupled to the processor of the external device, which, in turn, is communicably coupled to the eye-tracking means of the external device and to the face-tracking means of the external device. Optionally, when the optical element is implemented as the active optical element, the at least one processor is communicably coupled to the active optical element. The at least one processor could be implemented as any one of: a microprocessor, a microcontroller, or a controller. As an example, the at least one processor could be implemented as an application-specific integrated circuit (ASIC) chip or a reduced instruction set computer (RISC) chip.

Throughout the present disclosure, the term "gaze position" refers to a position on a field of view of the user onto which the gaze direction is mapped. The gaze position may, for example, be at a centre of the field of view of the user, at a point in a top-left region of the field of view, at a point in a bottom-right region of the field of view, or similar. Moreover, the term "gaze direction" refers to a direction in which the eye of the user is gazing. Optionally, when processing the tracking data for determining the gaze direction, the at least one processor is configured to employ at least one of: an image processing algorithm, a feature extraction algorithm, a data processing algorithm. Techniques for determining the gaze direction and the gaze position are well-known in art.

Further, the term "gaze velocity" refers to an angular velocity with which the user's gaze is changing, whereas the term "gaze acceleration" refers to an angular acceleration with which the user's gaze is changing. Optionally, when determining the gaze velocity, the at least one processor is configured to determine a rate of change of the gaze direction of the eye of the user within a given time period. In this regard, the at least one processor is configured to determine a distance between two consecutive gaze positions, and then divide said distance by a difference between respective time instants of determining the two consecutive gaze positions, for obtaining the gaze velocity in a particular direction. Optionally, when determining the gaze acceleration, the at least one processor is configured to determine a rate of change of the gaze velocity within the given time period. In this regard, the at least one processor is configured to determine a difference between two consecutive gaze velocities, and then divide said difference by a difference between respective time instants of determining the two consecutive gaze velocities, for obtaining the gaze acceleration in a particular direction. The gaze velocity and the gaze acceleration are used to determine how fast the user's gaze is changing. Techniques for determining the gaze velocity and/or the gaze acceleration are well-known in the art.

It will be appreciated that processing the tracking data may involve filtering and analysing the tracking data to derive only meaningful information from the tracking data. For example, filtering may involve removal or reduction of any noise or irrelevant information from the tracking data. This may be necessary because the eye-tracking means can produce vast amount of tracking data at high frequencies, and since not all such data is relevant or useful, said filtering can remove minor jittery movements that do not indicate any intentional gaze or facial movements. For instance, micro-movements caused by natural physiological tremors or external disturbances (like slight head movements) could also be filtered out to obtain a smoother and more interpretable tracking data for the at least one processor to process it in a time-efficient and a computationally-efficient manner. Furthermore, analysis may involve in-depth examination of filtered tracking data to identify patterns, trends, or specific characteristics that are of interest and usefulness, such as trajectories and dynamics of the user's gaze.

Throughout the present disclosure, the term "current visual activity" of the user refers to a visual task that the user is engaged in at a particular moment of time. The current visual activity could, for example, be reading text, focussing on an object or its part present in the environment, casual glancing, distance viewing, viewing an image or a video on a display of the external device, and the like. Once the at least one of: the gaze position, the gaze direction, the gaze velocity, the gaze acceleration are determined, the at least one processor can ascertain what the user is currently looking at, how eyes of the user are currently moving, whether the user's gaze is fixated, instances of saccades of the user's eye, and then can determine what visual activity the user is potentially engaged in, accordingly. As an example, when the gaze position is consistently same for a given period of time, it could indicate that the user is concentrating on an object (or its part) in the environment or on an image displayed on the screen of the external device. As another example, a regular left-to-right saccade patterns of the user's eye (namely, a raster scan-like trajectory of the user's gaze) may indicate the user is engaged in reading text. As yet another example, rapid and erratic shifts in the user's gaze may indicate casual glancing, while slower, more deliberate movements of the user's gaze may indicate activity that requires visual focussing such as reading text or closely focussing on an object or its features.

Additionally, when at least one of: the relative orientation of the user's face with respect to the display, the distance of the user's face from the display, is known, the at least one processor can ascertain whether the user is looking at the display, whether the user's face/head is oriented towards the display, whether the user's face is near the display or away from the display. Accordingly, it can be determined that the user is engaged with the display of the external device, for example, in a scenario when the user's face is near the display and he/she is looking at the display. The visual activity of the user may be reading text from the display, viewing an image or a video on the display, and the like. Optionally, the at least one processor is configured to determine at least one of: the relative orientation of the user's face with respect to the display of the external device, the distance of the user's face from the display of the external device, using pose-tracking means employed for tracking a pose of the external device and for tracking at least one of: a pose of the user's face, a pose of the optical apparatus (when worn by the user). The term "pose" encompasses a position and/or an orientation. An example, once the pose of the user's face and the pose of the external device are known, the at least one processor can determine said distance using, for example, a coordinate geometry-based technique. Pose-tracking means are well-known in the art. It will be appreciated that the relative orientation of the user's face and/or the distance of the user's face from the display could also be determined using, for example, a sensor (such as a depth camera, an infrared camera, a proximity sensor, or similar) of the external device.

Optionally, the current visual activity is determined to be a reading activity, when at least one of following criteria is satisfied: (i) an angle of convergence of gaze directions of the user's eyes is greater than a predefined angle, (ii) the gaze velocity and/or the gaze acceleration of the eye are indicative of an intermix of saccades and fixations along a given direction and another direction opposite to the given direction. In this regard, when the user is engaged in the reading activity, the user's eyes usually tend to converge more than when looking at any distant object. This is because the reading activity is usually performed by the user near his/her eyes, thereby requiring more convergence of the user's eye in order to bring both eyes' focal points onto a same word or a line of text. In addition to this, a nature of the user's eye movements during the reading activity is also distinct, having a combination of saccades and fixations. For example, saccades indicate rapid eye movements that occur as the user's eyes jump from one point to another, typically seen when transitioning from an end of one line in the text to a beginning of a next line in the text, while reading the text. It will be appreciated that the reading activity may be performed by the user in a left-to-right or a right-to-left manner (i.e., horizontally) or a top-to-bottom manner (i.e., vertically), or the like, depending on a language of the text. On the other hand, fixations indicate that the user's eyes are relatively stationary while reading, and these fixations are commonly observed when the user's eyes focus on words or phrases in the text while reading. In other words, the intermix of the saccades and the fixations along the given direction and the another direction possibly signifies a progression through a line of text, and a return to the beginning of the next/subsequent line in said text. It is to be understood that the gaze velocity and/or the gaze acceleration increase significantly during saccades, whereas the gaze velocity and/or the gaze acceleration decreases during fixations. Therefore, by analysing the angle of convergence in tandem with the gaze velocity and/or the gaze acceleration, the at least one processor can determine when the user is engaged in the reading activity, and this, in turn, allows to adapt the shading intensity of the optical element to enhance the user's reading experience. It will be appreciated that since the gaze directions of the user's eyes are already known, the at least one processor can accurately determine the angle of convergence. Herein, the predefined angle is based on Interpupillary distance (IPD), which is a distance between the centre of the pupils. Optionally, the predefined angle lies in a range of 1.5 degrees to 60 degrees inwards towards a nose of the user. The predefined angle may be, for example, from 1.5 degrees, 2 degrees, 10 degrees, 20 degrees, 30 degrees, 40 degrees or 50 degrees up to 10 degrees, 20 degrees, 30 degrees, 40 degrees, 50 degrees or 60 degrees.

Optionally, the current visual activity is determined to be a display-viewing activity, when the user's face is oriented towards the display and optionally when the distance of the user's face from the display is smaller than a predefined threshold distance. In this regard, when the user's face is oriented towards the display, it is determined that the user is facing the display, and this implies that a focus of the user's vision may be highly likely on a content or information presented on the display. Moreover, when the distance between the user's face and the display does not exceed the predefined threshold distance, it indicates that the distance between the user's face and the display is not so significant, and the display is highly likely to be in vicinity of the user. Thus, a short distance between the user's face and the display may indicate the user is concentrating on the display, such as watching a video on the display. Optionally, the predefined threshold distance lies in a range of 30 cm to 100 cm. The predefined threshold distance may be, for example, from 30 cm, 50 cm, 70 cm or 90 cm up to 50 cm, 70 cm, 90 cm or 100 cm. It will be appreciated that for different displays/scenarios, there could be different predefined threshold distances. As an example, when the display is a smartphone display, a typical viewing distance between the user's face and the smartphone display is approximately 40 centimetres. In such a case, the predefined threshold distance may be 50 centimetres. As another example, in case of a Heads-Up Display (HUD) of a vehicle, the viewing distance is typically 80 centimetres; in such a case, the predefined threshold distance may be 1 metre. Similarly, different predefined threshold distances could also be determined when the display is a laptop display, a computer display, and the like. It will be appreciated that by considering both the orientation of the user's face and its proximity to the display, the at least one processor can determine when the user is involved in the display-viewing activity, and this, in turn, allows to adapt the shading intensity of the optical element to ensure an enhanced strain-free viewing experience for the user.

Notably, once the ambient light intensity and the current visual activity of the user are known to the at least one processor, the shading intensity is determined for the optical element. Throughout the present disclosure, the term "shading intensity" refers to a degree or a level of tint or darkness to be applied to the optical element. Greater the shading intensity, greater is the level of tint or darkness to be applied to the optical element, and vice versa. It will be appreciated that the shading intensity is adjusted to regulate an amount of light that passes through the optical element and reaches the user's eyes, thereby ensuring user's visual comfort and improving user's visibility for different ambient lighting conditions and visual activities. In an example, the shading intensity may be determined using a mathematical function of the ambient light intensity for a specific visual activity. For instance, in bright outdoor conditions where the ambient light intensity is high, when the visual activity the user is determined to be reading text on the display of the external device, the shading intensity may be reduced to 50 percent of a maximum shading intensity. This improves user's visibility in reading the text in such environmental conditions. It will be appreciated that in bright outdoor conditions, a high shading intensity (namely, a high level of tint/darkness) may be required to be applied to the optical element, in order to counteract glare or excessive brightness. Conversely, in low-light conditions like dusk or indoor environments, a low shading intensity may be sufficient for providing improved visibility without straining the user's eye. In addition to this, a nature of the current visual activity of the user is also considered for determining the shading intensity. For instance, visual activities like reading text or focussing on the objects or their portions may necessitate different shading intensities, as compared to visual activities like casual glancing or distance viewing. For example, when the user is deeply engrossed in reading on the display of the external device, the shading intensity may be adjusted to reduce reflections and optimize clarity/legibility of text displayed on the display without straining the user's eye. On the other hand, when the user is viewing an image or video on the display, a different shading intensity may be preferred to enhance colour fidelity of the image or the video.

In some implementations, the shading intensity is measured in terms of percentage. For this purpose, a normalized scale can be employed, ranging from 0 to 100. On this scale, a value of 0 represents a minimum shading intensity, implying no shading applied to the optical element at all, while a value of 100 represents a maximum shading intensity, indicating a complete or near-complete tinting of the optical element. It will be appreciated that alternatively, a normalized scale ranging from 0 to 1 can also be employed, wherein 0 indicates a zero shading intensity and 1 indicates a maximum shading intensity. In other implementations, the shading intensity assigned to the optical element can be predefined for specific visual activities. In such a case, predefined values of the shading intensity are derived, for example, from data collected for different multiple users. This ensures a general adjustment of the shading intensity for the majority of users under similar visual activities. In yet other implementations, the shading intensity is specific for individual users. For instance, during an initial use or calibration phase of the optical apparatus, users may be provided with option(s) to select their preferred shading intensity for different visual activities as per their comfort and requirement. Additionally, the optical apparatus offers a feature for calibration during usage, allowing the users to adjust the shading intensity in real-time during usage, catering to changing environments or personal comfort levels. In order to facilitate such user-specific customization, user's input could be taken using input means on the optical apparatus or using a software application executing on a device associated with the user. The input means enable users to relay their preferences or adjustments to the shading intensity. It will be appreciated that by offering both generalized and user-specific approaches to determining the shading intensity, the optical apparatus ensures improved visual comfort and clarity, while catering to a wide range of users and environments with different ambient lighting conditions.

Once the shading intensity is determined, the at least one processor controls the light-control element to apply the shading intensity to the optical element. In other words, the at least one processor generates a control signal for controlling the light-control element to change its colour and/or the at least one optical property according to the determined shading intensity. It will be appreciated that as the user's environment or the visual activity of the user may change, the at least one processor continuously determines the shading intensity to be used for the optical element. Such a dynamic adjustment ensures that an intensity-optimized strain-free viewing experience is consistently provided to the user throughout a given session of using the optical apparatus.

Optionally, a plurality of output light intensities are associated with respective ones of a plurality of different visual activities, and wherein the at least one processor is further configured to:
  select an output light intensity, from amongst the plurality of output light intensities, based on the current visual activity of the user; and
  determine the shading intensity, further based on the output light intensity.

In this regard, a given output light intensity is pre-assigned to a given visual activity, i.e., based on a nature of the given visual activity (for example, what is the given visual activity, whether the given visual activity is to be performed in an outdoor environment or an indoor environment, and the like), and how much output light intensity is required for performing the given visual activity. Therefore, when the user is engaged in a particular visual activity, the processor identifies the current visual activity of the user; and selects a corresponding output light intensity. It will be appreciated that the plurality of output light intensities associated with respective visual activities can be pre-determined and pre-stored in a form of a look-up table, at a data repository that is communicably coupled to the at least one processor. The data repository could be implemented, for example, such as a memory of the at least one processor, a memory of the external device, a removable memory, a cloud-based database, or similar. Upon selecting the output light intensity, the at least one processor could determine the shading intensity, for example, based on a percentage of a difference between the ambient light intensity and the output light intensity with respect to the ambient light intensity. By having a direct correlation between visual activities and output light intensities, the optical apparatus can dynamically adjust the shading intensity as per user's need, offering a personalized/customized and strain-free visual experience to the user.

Optionally, the at least one processor is further configured to:
  process the sensor data, collected by the at least one light sensor, to determine direct light intensities along gaze directions of the user's eyes; and
  determine the shading intensity, further based on the direct light intensities.

In this regard, the term "direct light intensity" refers to an amount of light along a gaze direction of a user's eye. It will be appreciated that the environment may comprise different light sources (for example, such as lamps, display screens, candles, a bright object, or its part, and the like) and the user might be directly looking at (namely, focussing on) at least one of the light sources. In such a case, light from at least one of the light sources directly incidents along the gaze directions of the user's eyes, and therefore the direct light intensities are determined by the at least one processor. Then, the shading intensity is determined accordingly by taking into account the direct light intensities (in addition to the ambient light intensity). It will be appreciated that greater the direct light intensities, greater is the shading intensity to be used for the optical element, and vice versa. This is because when the direct light intensities are high, a high shading intensity may be applied to mitigate glare or excessive brightness, for ensuring user comfort and clear visibility. Direct light intensities are determined in a similar manner as the ambient light intensity is determined. In some implementations, the at least one light sensor that was employed to determine the ambient light intensity, is also employed to determine the direct light intensities along specific directions (such as along the gaze directions). In other implementations, separate light sensors are employed to determine the direct light intensities along specific directions. It will be appreciated that greater a number of light sensors, greater is the accuracy in determining the direct light intensities along the gaze directions. For an acceptable accuracy, a minimum of three light sensors could be preferred to be employed in the optical apparatus. Moreover, the at least one light sensor is at least partially sensitive to a light direction, and thus facilitates in determining not only a signal strength of light signals, but also a direction of a majority of the light signals.

Optionally, the at least one processor is further configured to:
  detect whether the direct light intensities exceed a predefined direct light intensity threshold for the current visual activity; and
  when it is detected that the direct light intensities exceed the predefined direct light intensity threshold, determine that the user is using the display of the external device during the current visual activity.

In this regard, the at least one processor compares the direct light intensities with the predefined direct light intensity threshold to differentiate between different ambient light conditions with respect to the user. When the direct light intensities exceed the predefined direct light intensity threshold, it is likely that the user is looking towards (namely, the user's gaze is oriented towards) the display and light from the display directly incident on the user's face. This could occur only when the user is using the display of the external device, and may be engaged in visual activities like reading, watching a video or an image, on the display. It will be appreciated that the aforesaid determination may facilitate the at least one processor to adjust the shading intensity accordingly, to provide an enhanced strain-free viewing experience to the user engaged in a display-viewing activity.

Optionally, the optical apparatus is communicably coupled to the external device or a server with which the external device is communicably coupled, and wherein the at least one processor is further configured to:
  generate a control signal to adjust a brightness level of the display of the external device, based on at least one of: the direct light intensities, the ambient light intensity, the predefined direct light intensity threshold; and
  transmit the control signal to the external device,
  wherein a processor of the external device is configured to adjust the brightness level of the display of the external device according to the control signal.

In this regard, in addition to applying the shading intensity to the optical element, the at least one processor also generates the control signal for adjusting the brightness level of the display of the external device. In an example, the ambient light intensity may be 20 units, the direct light intensity may be 30 units, and the direct light intensity threshold may be 25 units. In such a case, it may be determined that the user is using the display of the external device, and the processor of the external device could adjust the brightness level of the display by reducing the direct light intensity (of light emanating from the display) to be equal to the ambient light intensity, or by reducing the direct light intensity to be equal to the direct light intensity threshold. In this way, it is ensured that the brightness of the display is optimally adjusted for user's viewing experience to be comfortable (i.e., strain-free) along with a high visual clarity, when engaging with the external device.

The present disclosure also relates to the second aspect as described above. Various embodiments and variants disclosed above, with respect to the aforementioned first aspect, apply mutatis mutandis to the second aspect.

Optionally, a plurality of output light intensities are associated with respective ones of a plurality of different visual activities, and wherein the method further comprises:
  selecting an output light intensity, from amongst the plurality of output light intensities, based on the current visual activity of the user; and
  determining the shading intensity, further based on the output light intensity.

Optionally, the current visual activity is determined to be a reading activity, when at least one of following criteria is satisfied: (i) an angle of convergence of gaze directions of the user's eyes is greater than a predefined angle, (ii) the gaze velocity and/or the gaze acceleration of the eye are indicative of an intermix of saccades and fixations along a given direction and another direction opposite to the given direction.

Optionally, the current visual activity is determined to be a display-viewing activity, when the user's face is oriented towards the display and optionally when the distance of the user's face from the display is smaller than a predefined threshold distance.

Optionally, the method further comprises:
  processing the sensor data, collected by the at least one light sensor, for determining direct light intensities along gaze directions of the user's eyes; and
  determining the shading intensity, further based on the direct light intensities.

Optionally, the method further comprises:
  detecting whether the direct light intensities exceed a predefined direct light intensity threshold for the current visual activity; and
  when it is detected that the direct light intensities exceed the predefined direct light intensity threshold, determining that the user is using the display of the external device during the current visual activity.

Optionally, the optical apparatus is communicably coupled to the external device or a server with which the external device is communicably coupled, and the method further comprises:
  generating a control signal for adjusting a brightness level of the display of the external device, based on at least one of: the direct light intensities, the ambient light intensity, the predefined direct light intensity threshold; and
  transmitting the control signal to the external device,
  wherein a processor of the external device is configured to adjust the brightness level of the display of the external device according to the control signal.

DETAILED DESCRIPTION OF THE DRAWINGS

Referring to FIG. 1, illustrated is an optical apparatus 100 incorporating adaptive shading adjustment in use, according to an embodiment of the present disclosure. The optical apparatus 100 comprises an optical element per eye (depicted as an optical element 102 corresponding to an eye 104), a light-control element (depicted as a light-control element 106) arranged on an optical path of light 108, at least one light sensor (depicted as a light sensor 110), and at least one processor (depicted as a processor 112). The processor 112 is communicably coupled with the light-control element 106, and the light sensor 110. Optionally, the processor 112 is communicably coupled to an eye-tracking means 114 of the optical apparatus 100. In some implementations, the processor 112 is communicably coupled to an external device 116 (specifically, a processor 126 of the external device 116). In this regard, the processor 126 of the external device 116 is communicably coupled to at least one of: an eye-tracking means 120 of the external device 116, a face-tracking means 122 of the of the external device 116, and is optionally configured to send tracking data collected by the at least one of: the eye-tracking means 120, the face-tracking means 122, to the processor 112 of the optical apparatus 100. In other implementations, the processor 112 of the optical apparatus 100 could be communicably coupled to a server 118 with which the external device 116 is also communicably coupled. In such implementations, the processor 112 of the optical apparatus 100 is configured to receive the tracking data collected by the at least one of: the eye-tracking means 120, the face-tracking means 122, from the server 118. Moreover, the external device 116 optionally also comprises a display 124.

The processor 112 of the optical apparatus 100 is configured to: process tracking data, collected by at least one of: the eye-tracking means 114 of the optical apparatus 100, the eye-tracking means 120 of an external device 116, the face-tracking means 122 of the external device 116, to determine at least one of a gaze position, a gaze direction, a gaze velocity, a gaze acceleration, per eye 104 of a user; determine a current visual activity of the user based on the at least one of the gaze position, the gaze direction, the gaze velocity, the gaze acceleration, a relative orientation of the user's face with respect to the display 124 of the external device 116, a distance of the user's face from the display 124; process sensor data, collected by the light sensor 110, to determine an ambient light intensity in an environment where the optical apparatus 100 is being used; determine a shading intensity to be used for the optical element 102, based on the ambient light intensity and the current visual activity of the user; and control the light-control element 106 to apply the shading intensity to the optical element 102.

FIG. 1 is merely an example, which should not unduly limit the scope of the claims herein. A person skilled in the art will recognize many variations, alternatives, and modifications of embodiments of the present disclosure.

Figure 2:
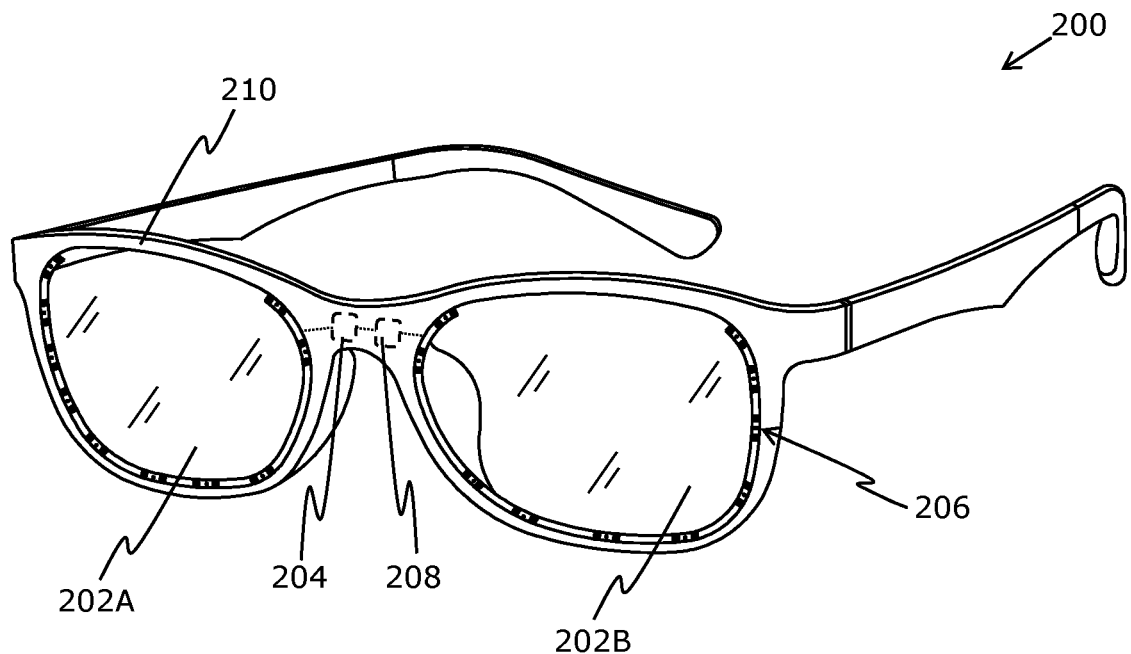
FIG. 2 is a schematic illustration of an optical apparatus incorporating adaptive shading adjustment, in accordance with an embodiment of the present disclosure.

Referring to FIG. 2, illustrated is schematic illustration of an optical apparatus 200 incorporating adaptive shading adjustment, in accordance with an embodiment of the present disclosure. As shown, for example, the optical apparatus 200 is implemented as a pair of eyeglasses. The optical apparatus 200 comprises an optical element per eye (depicted as an optical element 202A for a right eye and an optical element 202B for a left eye), a light-control element (not visible from this perspective) arranged on an optical path of light passing through the optical elements 202A-B, at least one light sensor (depicted as a light sensor 204), an eye-tracking means 206, and at least one processor (depicted as a processor 208). The optical apparatus 200 also comprises a frame 210 employed for holding the optical elements 202A-B, and for incorporating the light sensor 204, the eye-tracking means 206, and the processor 208 therein.

The processor 208 is communicably coupled with the light-control element, the light sensor 204 and the eye-tracking means 206.

FIG. 2 is merely an example, which should not unduly limit the scope of claims therein. It is to be understood that the specific implementation of the optical apparatus 200 is provided as an example and is not to be construed as limiting it to specific numbers or types of optical elements, components of the eye-tracking means, and input means. A person skilled in the art will recognize many variations, alternatives, and modifications of embodiments of the present disclosure.

Figure 3A:
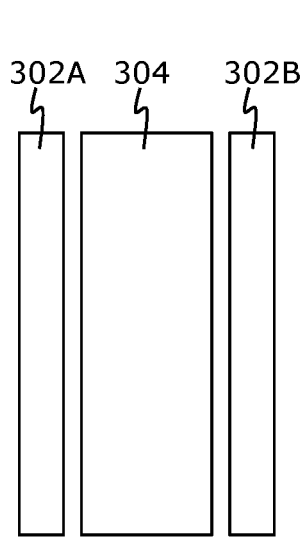
FIGS. 3A, 3B and 3C are schematic illustrations of implementations of a light-control element of an optical apparatus, in accordance with various embodiments of the present disclosure.
Figure 3B:
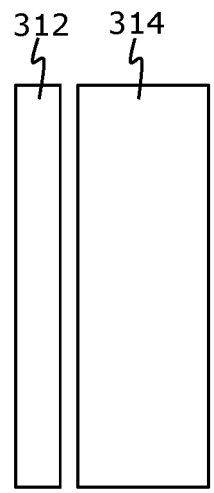
Figure 3C:
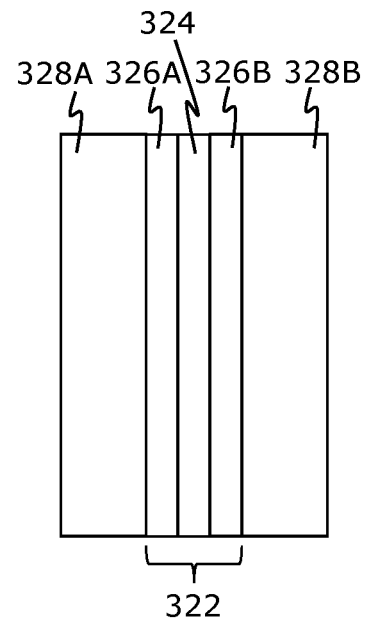

Referring to FIGS. 3A, 3B, and 3C, there are shown schematic illustrations of implementations of a light-control element with respect to an optical element of an optical apparatus (not shown), in accordance with various embodiments of the present disclosure. In FIG. 3A, the light-control element is implemented as a first polarizer 302A and a second polarizer 302B. The first polarizer 302A and the second polarizer 302B are shown to be arranged, for example, on different sides of an optical element 304, but could also be arranged on a same side of the optical element 304. In FIG. 3B, the light-control element is implemented as an electrochromic element 312. The electrochromic element 312 is for example, arranged on one side of an optical element 314 that faces an environment where the optical apparatus is being used. In FIG. 3C, the light-control element is implemented as a liquid crystal element 322 which comprises a liquid crystal active material 324 disposed between two optically transparent electrodes 326A and 326B, wherein said electrodes 326A-B are arranged on optically transparent substrates 328A and 328B, respectively.

FIGS. 3A-3C are merely examples, which should not unduly limit the scope of the claims herein. A person skilled in the art will recognize many variations, alternatives, and modifications of embodiments of the present disclosure.

Figure 4:
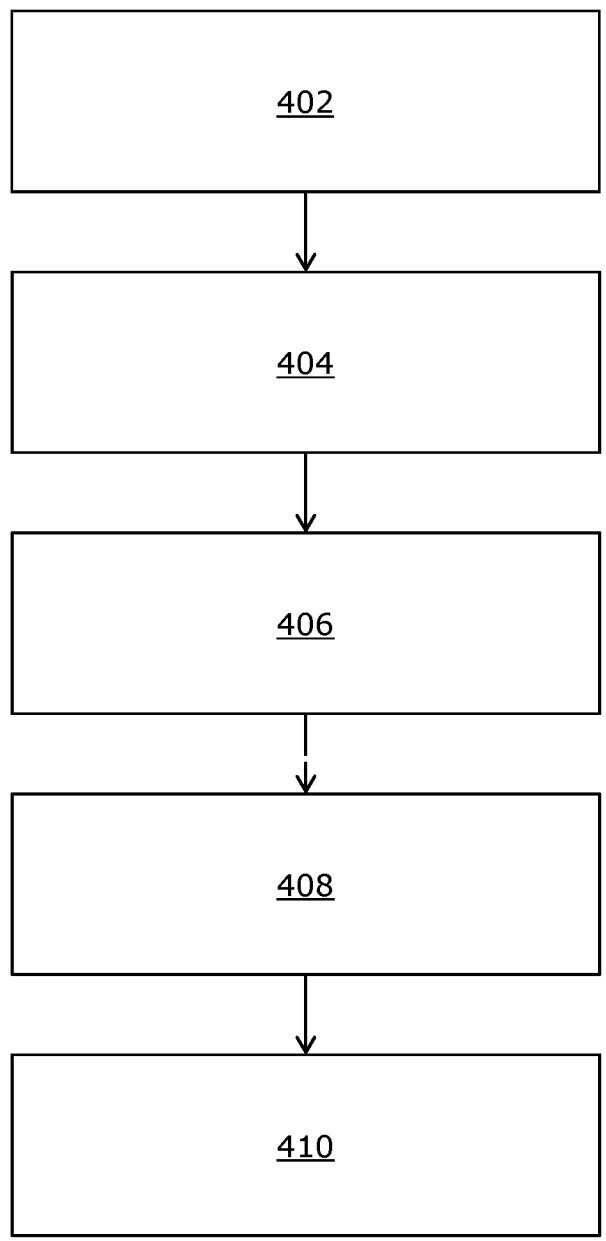
FIG. 4 illustrates steps of a method incorporating adaptive shading adjustment in an optical apparatus, in accordance with an embodiment of the present disclosure.

Referring to FIG. 4, illustrated are steps of a method incorporating adaptive shading adjustment in an optical apparatus, in accordance with an embodiment of the present disclosure. At step 402, tracking data, collected by at least one of: an eye-tracking means of the optical apparatus, an eye-tracking means of an external device, a face-tracking means of the external device, is processed for determining at least one of: a gaze position, a gaze direction, a gaze velocity, a gaze acceleration, per eye of a user. At step 404, a current visual activity of the user is determined based on the at least one of: the gaze position, the gaze direction, the gaze velocity, the gaze acceleration, a relative orientation of the user's face with respect to a display of the external device, a distance of the user's face from the display. At step 406, sensor data, collected by the at least one light sensor, is processed for determining an ambient light intensity in an environment where the optical apparatus is being used. At step 408, a shading intensity to be used for the optical element is determined, based on the ambient light intensity and the current visual activity of the user. At step 410, the light-control element is controlled for applying the shading intensity to the optical element.

The aforementioned steps are only illustrative and other alternatives can also be provided where one or more steps are added, one or more steps are removed, or one or more steps are provided in a different sequence without departing from the scope of the claims herein.

The invention claimed is:

1. An optical apparatus comprising:
   an optical element per eye;
   a light-control element arranged on an optical path of light passing through the optical element;
   at least one light sensor; and
   at least one processor configured to:
     process tracking data, collected by at least one of: an eye-tracking means of the optical apparatus, an eye-tracking means of an external device, a face-tracking means of the external device, to determine at least one of: a gaze position, a gaze direction, a gaze velocity, a gaze acceleration, per eye of a user;
     determine a current visual task in which the user is engaged selected from at least one of: reading text, focusing on an object or a part of the object, casual glancing, distance viewing, viewing an image or a video on a display;
     process sensor data, collected by the at least one light sensor, to determine an ambient light intensity in an environment where the optical apparatus is being used;
     determine a shading intensity of a level of tint or darkness to be used for the optical element, based on the ambient light intensity and the current visual task of the user; and
     control the light-control element to apply the shading intensity to the optical element.

2. The optical apparatus of claim 1, wherein a plurality of output light intensities are associated with respective ones of a plurality of different visual activities, and wherein the at least one processor is further configured to:
   select an output light intensity, from amongst the plurality of output light intensities, based on the current visual task of the user; and
   determine the shading intensity, further based on the output light intensity.

3. The optical apparatus of claim 1, wherein the current visual task is determined to be a reading activity, when at least one of an angle of convergence of gaze directions of the user's eyes is greater than a predefined angle and the gaze velocity and/or the gaze acceleration of the eye are indicative of an intermix of saccades and fixations along a given direction and another direction opposite to the given direction.

4. The optical apparatus of claim 1, wherein the current visual task is determined to be a display-viewing activity, when the user's face is oriented towards the display and optionally when a distance of the user's face from the display is smaller than a predefined threshold distance.

5. The optical apparatus of claim 1, wherein the at least one processor is further configured to:
   process the sensor data, collected by the at least one light sensor, to determine direct light intensities along gaze directions of the user's eyes; and
   determine the shading intensity, further based on the direct light intensities.

6. The optical apparatus of claim 5, wherein the at least one processor is further configured to:
   detect whether the direct light intensities exceed a predefined direct light intensity threshold for the current visual task; and
   when it is detected that the direct light intensities exceed the predefined direct light intensity threshold, determine that the user is using the display of the external device during the current visual task.

7. The optical apparatus of claim 6, wherein the optical apparatus is communicably coupled to the external device or a server with which the external device is communicably coupled, and wherein the at least one processor is further configured to:
   generate a control signal to adjust a brightness level of the display of the external device, based on at least one of: the direct light intensities, the ambient light intensity, the predefined direct light intensity threshold; and
   transmit the control signal to the external device,
   wherein a processor of the external device is configured to adjust the brightness level of the display of the external device according to the control signal.

8. The optical apparatus of claim 1, wherein the light-control element is implemented as at least one of: an electrochromic element, a liquid crystal element, at least two polarizers.

9. A method implemented by an optical apparatus comprising an optical element per eye, a light-control element arranged on an optical path of light passing through the optical element, at least one light sensor, and at least one processor, wherein the method comprises:
   processing tracking data, collected by at least one of: an eye-tracking means of the optical apparatus, an eye-tracking means of an external device, a face-tracking means of the external device, for determining at least one of: a gaze position, a gaze direction, a gaze velocity, a gaze acceleration, per eye of a user;
   determining a current visual task in which the user is engaged selected from at least one of: reading text, focusing on an object or a part of the object, casual glancing, distance viewing, viewing an image or a video on a display;
   processing sensor data, collected by the at least one light sensor, for determining an ambient light intensity in an environment where the optical apparatus is being used;
   determining a shading intensity of a level of tint or darkness to be used for the optical element, based on the ambient light intensity and the current visual task of the user; and
   controlling the light-control element for applying the shading intensity to the optical element.

10. The method of claim 9, wherein a plurality of output light intensities are associated with respective ones of a plurality of different visual activities, and wherein the method further comprises:
    selecting an output light intensity, from amongst the plurality of output light intensities, based on the current visual task of the user; and
    determining the shading intensity, further based on the output light intensity.

11. The method of claim 9, wherein the current visual task is determined to be a reading activity, when at least one of an angle of convergence of gaze directions of the user's eyes is greater than a predefined angle and the gaze velocity and/or the gaze acceleration of the eye are indicative of an intermix of saccades and fixations along a given direction and another direction opposite to the given direction.

12. The method of claim 9, wherein the current visual task is determined to be a display-viewing activity, when the user's face is oriented towards the display and optionally when the distance of the user's face from the display is smaller than a predefined threshold distance.

13. The method of claim 9, further comprising:
    processing the sensor data, collected by the at least one light sensor, for determining direct light intensities along gaze directions of the user's eyes; and
    determining the shading intensity, further based on the direct light intensities.

14. The method of claim 13, further comprising:
- detecting whether the direct light intensities exceed a predefined direct light intensity threshold for the current visual task; and
- when it is detected that the direct light intensities exceed the predefined direct light intensity threshold, determining that the user is using the display of the external device during the current visual task.

15. The method of claim 14, wherein the optical apparatus is communicably coupled to the external device or a server with which the external device is communicably coupled, and wherein the method further comprises:
- generating a control signal for adjusting a brightness level of the display of the external device, based on at least one of: the direct light intensities, the ambient light intensity, the predefined direct light intensity threshold; and
- transmitting the control signal to the external device,
- wherein a processor of the external device is configured to adjust the brightness level of the display of the external device according to the control signal.

16. The method of claim 9, wherein the light-control element is implemented as at least one of: an electrochromic element, a liquid crystal element, at least two polarizers.

\* \* \* \* \*